(12) United States Patent
Kalley et al.

(10) Patent No.: US 12,260,261 B2
(45) Date of Patent: Mar. 25, 2025

(54) REMOTE CLOUD FUNCTION INVOCATION SERVICE

(71) Applicant: Oracle International Corporation, Redwood Shores, CA (US)

(72) Inventors: Harshit Kumar Kalley, Sunnyvale, CA (US); Srikanth Vavilapalli, Dublin, CA (US); Akshay Atul Shah, San Jose, CA (US); Debjani Saha, Milpitas, CA (US); Alex Jun-Chern Chen, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 122 days.

(21) Appl. No.: 17/850,693

(22) Filed: Jun. 27, 2022

(65) Prior Publication Data

US 2023/0359508 A1  Nov. 9, 2023

Related U.S. Application Data

(60) Provisional application No. 63/339,753, filed on May 9, 2022.

(51) Int. Cl.
*G06F 9/50* (2006.01)
*G06F 9/455* (2018.01)
*H04L 67/12* (2022.01)

(52) U.S. Cl.
CPC ........ *G06F 9/5077* (2013.01); *G06F 9/45558* (2013.01); *H04L 67/12* (2013.01)

(58) Field of Classification Search
CPC ..... G06F 9/5077; G06F 9/45558; H04L 67/12
See application file for complete search history.

(56) References Cited

U.S. PATENT DOCUMENTS 10,917,358 B1 * 2/2021 Herle .................... H04L 47/783
11,316,936 B2   4/2022 Wells et al.
(Continued)

FOREIGN PATENT DOCUMENTS

EP      3361700 B1      8/2021

OTHER PUBLICATIONS

PCT/US2023/019284, "International Search Report and Written Opinion", Aug. 10, 2023, 21 pages.

*Primary Examiner* — Chris Parry
*Assistant Examiner* — Steven C Nguyen
(74) *Attorney, Agent, or Firm* — Kilpatrick Townsend & Stockton LLP

(57) ABSTRACT

The present disclosure relates to a framework that provides execution of serverless functions in a cloud environment based on occurrence of events/notifications from services in an entirely different cloud environment. A target agent obtains a notification from a source agent, where the target agent is deployed in a target cloud environment and the source agent is deployed in a source cloud environment that is different than the target cloud environment. The target agent determines a function that is to be invoked based on the notification. Upon successfully verifying whether the target agent is permitted to invoke the function that is deployed in a target customer tenancy of the target cloud environment, the target agent invokes the function in the target customer tenancy of the target cloud environment.

15 Claims, 14 Drawing Sheets

(56) References Cited

U.S. PATENT DOCUMENTS

| | | | |
|---|---|---|---|
| 2016/0065417 A1* | 3/2016 | Sapuram | H04L 41/50 |
| | | | 709/223 |
| 2018/0139149 A1* | 5/2018 | Chen | G06F 9/5072 |
| 2020/0336570 A1* | 10/2020 | Harper | H04L 12/46 |
| 2021/0067423 A1* | 3/2021 | Newman | H04L 41/5048 |
| 2021/0409345 A1 | 12/2021 | Elmenshawy et al. | |
| 2022/0413903 A1* | 12/2022 | Kalley | G06F 9/5072 |
| 2023/0342179 A1* | 10/2023 | Suttle | H04L 41/0894 |

\* cited by examiner

REMOTE CLOUD FUNCTION INVOCATION SERVICE

CROSS-REFERENCES TO RELATED APPLICATIONS

This application is a non-provisional of and claims the benefit of the filing date of U.S. Provisional Application No. 63/339,753, filed on May 9, 2022, the contents of which are incorporated herein by reference in its entirety for all purposes.

FIELD

The present disclosure relates to a framework that provides execution of serverless functions in a cloud environment based on occurrence of events/notifications from services in an entirely different cloud environment.

BACKGROUND

A cloud service provider (CSP) offers a suite of services to customers of the cloud environment. One such service is referred to as Function-as-a-Service (FaaS). FaaS is a category of cloud computing services that provides a platform allowing customers to develop, execute, and manage application functionalities without incurring the complexity of building and maintaining the infrastructure typically associated with developing and launching an application. Building an application following this model is one way of achieving a "serverless" architecture and is typically used when building microservices applications. Several cloud providers (e.g., Amazon Web Services (AWS), Google Cloud Platform (GCP), and Oracle Cloud Infrastructure) provide a version of this service on their public cloud.

Typically, CSPs incentivize local function invocation by tightly integrating the functions with other services provided by the CSP. In other words, as part of a serverless functions offering, the CSP provides functionality to integrate the serverless functions with events/notifications from other native services supported in that cloud. For instance, customers can specify a serverless function to be invoked upon an occurrence of an event in the same cloud (e.g., when an object is added to a storage unit). However, this integration of serverless functions with events/notifications from services in a different cloud is currently not supported by any CSPs. As such, the currently offered serverless function models of different CSPs constrain customers from leveraging cheaper resources (e.g., compute resources, storage resources, or the like in other cloud environments). Embodiments discussed herein address these and other issues individually as well as collectively.

SUMMARY

The present disclosure relates generally to a framework that provides integration between serverless functions in a cloud environment based on occurrence of events/notifications from services in an entirely different cloud environment. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure provides for a method comprising: obtaining, by a target agent a notification from a source agent, the target agent being deployed in a target cloud environment and the source agent being deployed in a source cloud environment that is different than the target cloud environment; determining, by the target agent, a function that is to be invoked based on the notification; verifying whether the target agent is permitted to invoke the function that is deployed in a target customer tenancy of the target cloud environment; and responsive to a successful verification, invoking by the target agent the function in the target customer tenancy of the target cloud environment.

Another aspect of the present disclosure provides for a system comprising: a processor; and a memory including instructions that, when executed with the processor, cause the system to, at least: obtain, by a target agent a notification from a source agent, the target agent being deployed in a target cloud environment and the source agent being deployed in a source cloud environment that is different than the target cloud environment; determine, by the target agent, a function that is to be invoked based on the notification; verify whether the target agent is permitted to invoke the function that is deployed in a target customer tenancy of the target cloud environment; and responsive to a successful verification, invoke by the target agent the function in the target customer tenancy of the target cloud environment.

Another aspect of the present disclosure provides for a non-transitory computer readable medium storing specific computer-executable instructions that, when executed by a processor, cause a computer system to perform operations comprising: obtaining, by a target agent a notification from a source agent, the target agent being deployed in a target cloud environment and the source agent being deployed in a source cloud environment that is different than the target cloud environment; determining, by the target agent, a function that is to be invoked based on the notification; verifying whether the target agent is permitted to invoke the function that is deployed in a target customer tenancy of the target cloud environment; and responsive to a successful verification, invoking by the target agent the function in the target customer tenancy of the target cloud environment.

The foregoing, together with other features and embodiments will become more apparent upon referring to the following specification, claims, and accompanying drawings.

DETAILED DESCRIPTION

Figure 1A:
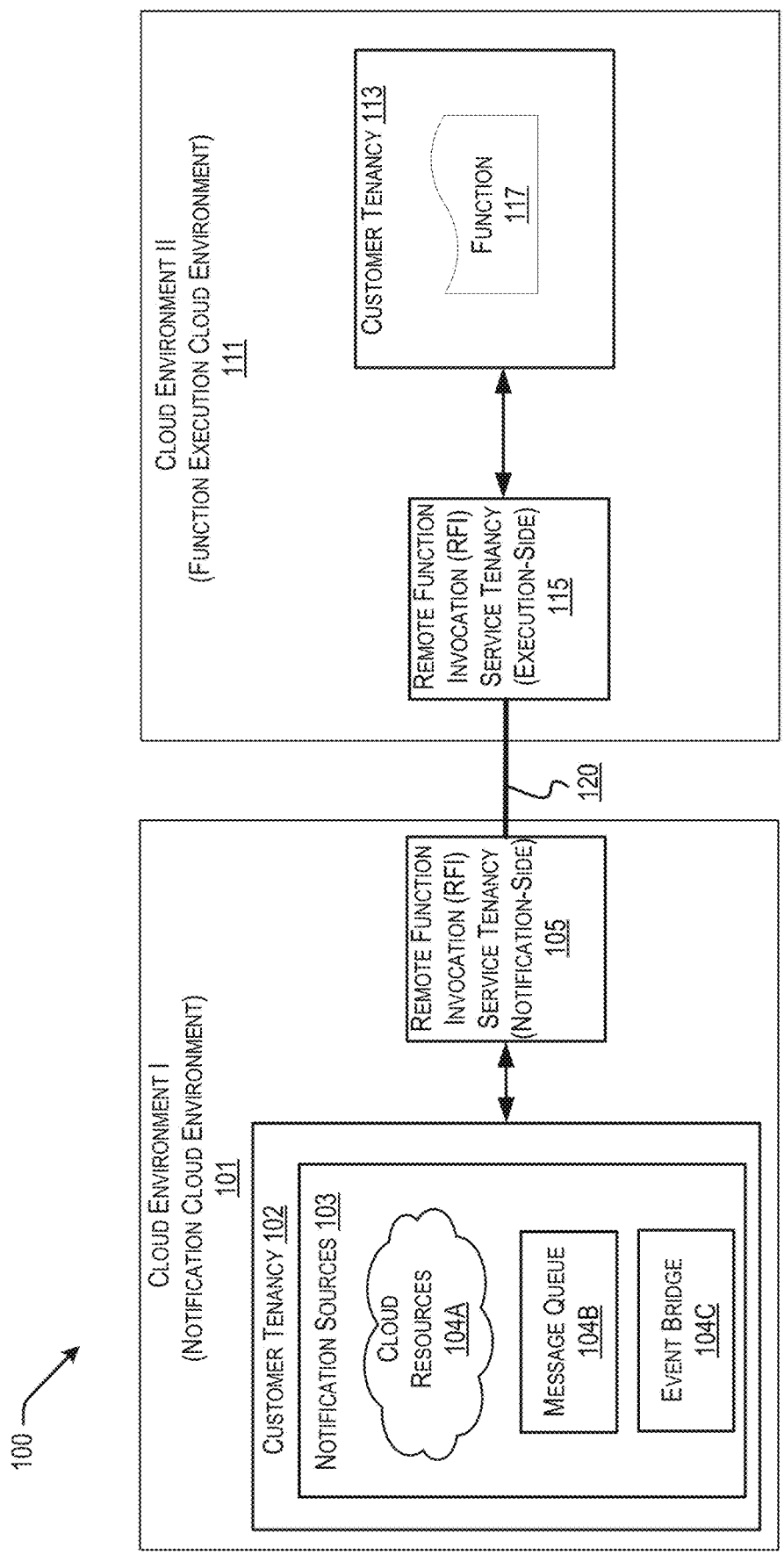
FIG. 1A depicts an exemplary architecture of a remote function invocation (RFI) service in accordance with various embodiments.

In the following description, for the purposes of explanation, specific details are set forth in order to provide a thorough understanding of certain embodiments. However, it will be apparent that various embodiments may be practiced without these specific details. The figures and descriptions are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Remote function invocation (RFI) is a framework of services and application interfaces (APIs) that allow users of a public cloud environment (e.g., a source cloud environment) to run serverless workloads on a remote cloud environment (e.g., a target cloud environment) as a set of one or more functions, as if the functions are being executed locally. In other words, the set of one or more functions appear as native functions of the source cloud environment.

The RFI framework provides users with programming constructs to register and invoke functions on a remote cloud, in response to a notification obtained from a service that is executed in another cloud environment. For sake of clarity, the cloud environment where a notification is generated is referred to herein as a "notification cloud environment," and the cloud environment where the one or more functions are executed is referred to herein as an "execution cloud environment." It is noted that the notification cloud environment is different and independent from the execution cloud environment. Further, the RFI framework also provides a mechanism to poll on services (in the notification cloud environment), which do not generate events in order to invoke a function in the execution cloud environment. In essence, the RFI framework allows cloud application developers to burst compute sensitive workloads to other clouds in units of function with simple application configuration changes. In doing so, the RFI framework allows users to leverage other cloud environment(s) for higher availability, lower costs, or obtain workload scalability.

It is appreciated that delegation of functions to a remote cloud (i.e., execution cloud environment) may be further complicated by the nature of embedding in the application workflow. Functions can be triggered from many different services (i.e., in the notification cloud environment) and can invoke other functions or services. The RFI framework of the present disclosure is a generic framework of services and APIs that allow users in a cloud environment to remotely invoke functions (and execute them) in another cloud environment. Further, it is noted that the RFI framework described herein may be easily extended to any number of public cloud environments, which do not implicitly interoperate together.

According to some embodiments, the RFI service framework provides a user interface and command line interface (CLI) that provisions users of a cloud environment to configure an RFI instance in a customer's tenancy included in the cloud environment. As will be described here in detail, the RFI service framework has a notification forwarder component (referred to herein as a forwarder agent included in the notification cloud environment) that listens to events and polls on services in the notification cloud environment. The forwarder agent forwards such notifications to a remote cloud environment (i.e., execution cloud environment), where the notifications are received by a receiver agent (referred to herein as a listener agent). The listener agent included in the execution cloud environment verifies roles and invokes functions on behalf of the user. It is noted that the forwarder agent and the listener agent are disposed on either side of the two cloud environments (i.e., the notification cloud environment and the execution cloud environment) that and are connected by a secure intercloud notification bus. According to some embodiments, the notification bus is built on top of a trusted, high-speed communication link (e.g., FastConnect link) that is setup between the two cloud environments.

According to some embodiments, the RFI service framework provides a user the flexibility to define which set of services in the notification cloud environment that the user desires to receive notifications. Users can alternatively define which services (in notification cloud environment) the users want an RFI instance (deployed in the notification cloud environment) to poll on and watch for a rule to trigger. RFI instance in the notification cloud environment may convert the trigger into a notification. The notification is transmitted to the execution cloud environment, where a corresponding RFI instance (i.e., deployed in the execution cloud environment) triggers a function for execution. It is appreciated that the User has already registered the particular function with the execution cloud environment (e.g., as a FaaS).

According to some embodiments, on the notification cloud environment side, users grant permissions to RFI Service to receive notifications from service(s) utilized by cloud resources or poll on service instance(s) through a standard role based access control (RBAC) APIs. On the execution cloud environment side, users grant permissions to RFI service instance to invoke a function on behalf of a customer. It is appreciated that the RFI framework provides a multi-tenant, generic, cloud and service agnostic way to securely invoke remote functions on a cloud of choice as desired by the user. Additionally, the RFI service framework provides functionalities such as auditing, monitoring, logging, and metering capabilities.

FIG. 1A depicts an exemplary architecture of a remote function invocation (RFI) service accordance with various embodiments. The architecture 100 of the RFI service includes a source cloud environment (i.e., cloud environment I 101) that is referred to herein as a notification cloud environment and a target cloud environment (i.e., cloud environment II 111) that is referred to herein as an execution cloud environment. Each of the notification cloud environment 101 and the execution cloud environment 111 includes an instance of the RFI service tenancy. For example, as shown in FIG. 1A, the notification cloud environment 101 includes an RFI service tenancy 105 that is referred to herein as a notification-side RFI service tenancy and the execution cloud environment 111 includes an RFI service tenancy 115 that is referred to herein as an execution-side RFI service tenancy. Further, the notification cloud environment 101 includes a customer tenancy 102 and the execution cloud environment includes a customer tenancy 113.

The RFI service provides for execution of a function 117 deployed in the customer tenancy 113 of the execution cloud environment 111 in response to a notification received from the RFI service tenancy 105 (i.e., notification-side RFI service tenancy) in the notification cloud environment 101. The notification-side RFI service tenancy 105 is configured to receive notifications from notification sources 103 deployed in the customer tenancy 102 of the notification cloud environment 101. Specifically, according to one embodiment, the notification-side RFI service tenancy 105 registers itself with cloud resources 104A to be a target for receiving notifications with respect to occurrence of any events pertaining to the cloud resources 104A or notifications generated by a service utilized by the cloud resources.

In some embodiments, a service that is utilized by the cloud resources 104A may be incapable of generating any notifications (e.g., a queuing service). In such cases, the notification-side RFI service tenancy 105 is configured to poll the service or a message queue 104B or an event bridge 104C to obtain a notification or determine occurrence of an event. The occurrence of an event or notification is associated with a request to execute a function. As stated above, the RFI framework allows users to leverage other cloud environment(s) for higher availability, lower costs, etc. As such, the notification(s) obtained by the notification-side RFI service tenancy 105 is transmitted to the execution-side RFI service tenancy 115, which executes the requested function 117 deployed in the customer tenancy 113 of the execution-side cloud environment. In this manner, the RFI service framework provides integration between functions executed in one cloud environment with events/notifications from services in an entirely different cloud environment. A detailed architecture of the RFI service is described here with reference to FIG. 2.

Figure 1B:
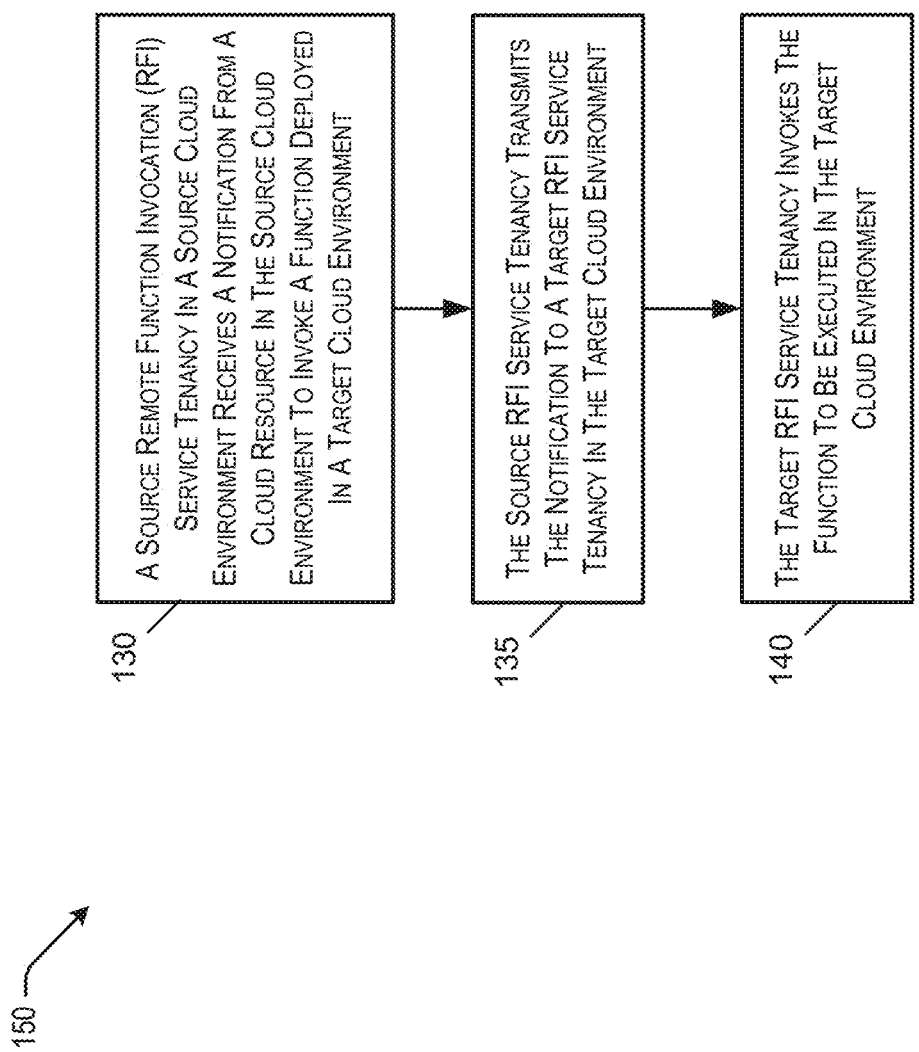
FIG. 1B illustrates a simplified flowchart depicting steps performed by the RFI service, according to certain embodiments.

FIG. 1B illustrates a simplified flowchart 150 depicting steps performed by the RFI service according to certain embodiments. The processing depicted in FIG. 1B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 1B and described below is intended to be illustrative and non-limiting. Although FIG. 1B depicts the various processing steps occurring in a particular sequence or order, this is not intended to be limiting. In certain alternative embodiments, the steps may be performed in some different order, or some steps may also be performed in parallel.

The process commences in step 130, where a source RFI service tenancy (i.e., notification-side RFI service tenancy) included in a source cloud environment (i.e., notification cloud environment) receives a notification from a service utilized by a cloud resource included in the source cloud environment. For instance, the notification-side RFI tenancy 105 included in the notification cloud environment 101 receives a notification from a cloud resource (utilizing a service). In one implementation, it is noted that the notification corresponds to a request for execution of a function deployed in a target cloud environment (e.g., execution cloud environment 111) that is different than the source cloud environment.

In step 135, the source RFI service tenancy transmits the notification to a target RFI service tenancy (i.e., execution-side RFI service tenancy) included in the target cloud environment (i.e., execution side environment). For example, the notification-side RFI service tenancy forwards the notification to the execution-side RFI service tenancy included in the execution cloud environment. The process then moves to step 140, where the target RFI service tenancy (i.e., the execution-side RFI service tenancy) invokes the function to be executed in the target cloud environment. For instance, referring to FIG. 1A, the execution-side RFI service tenancy 115 invokes the function 117 (deployed in the customer tenancy 113 of the execution cloud environment 111) to be executed.

Figure 2:
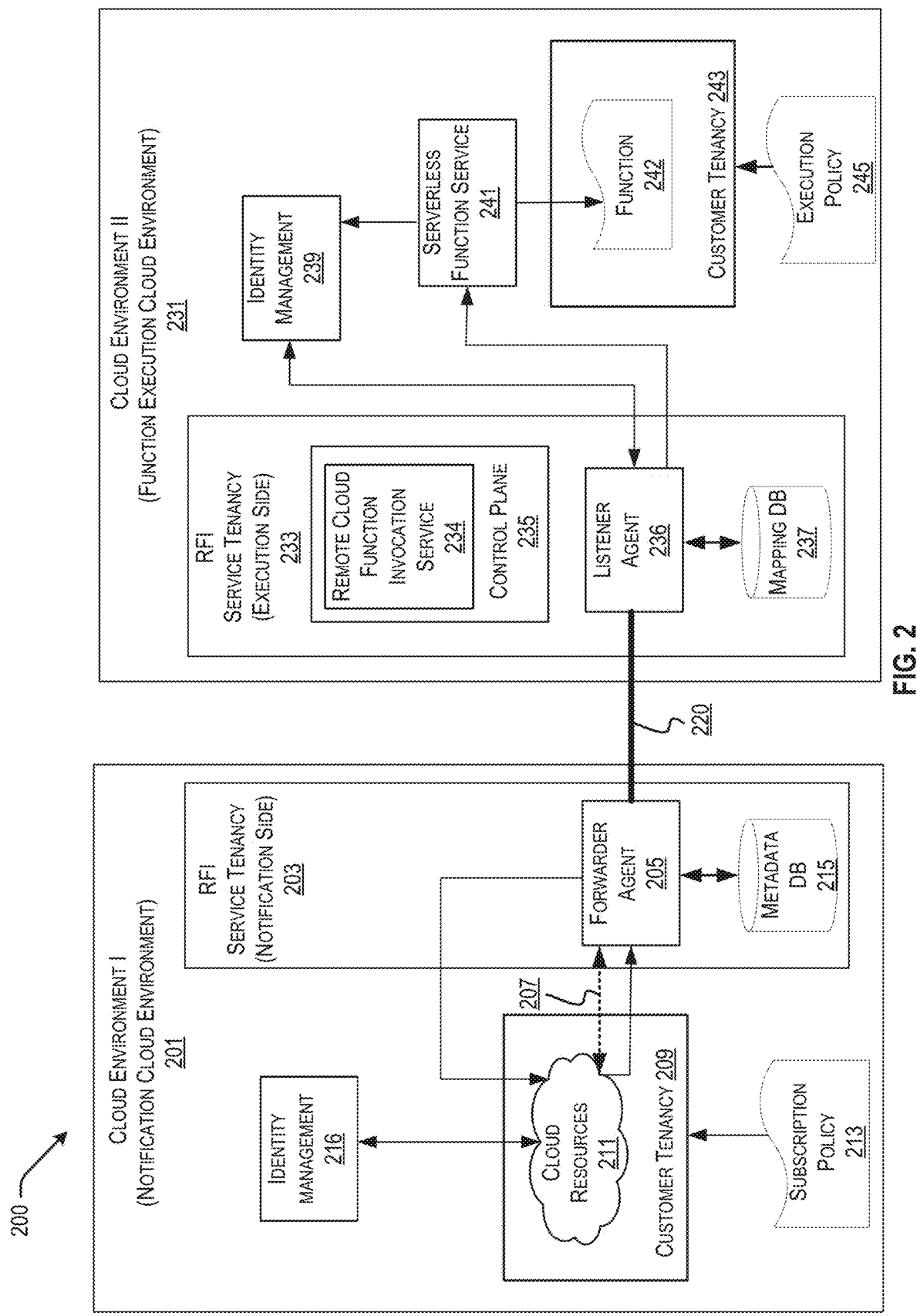
FIG. 2 depicts an exemplary detailed architecture of the RFI service in accordance with various embodiments.

Turning now to FIG. 2, there is depicted an exemplary detailed architecture of the RFI service in accordance with various embodiments. As shown in FIG. 2, the architecture 200 of the RFI service includes a source cloud environment (i.e., cloud environment I) that is referred to here as a notification cloud environment 201, and a target cloud environment (i.e., cloud environment II) that is referred to here as an execution cloud environment 231. As stated previously, the RFI service of the present disclosure aims to provide integration between serverless functions in one cloud environment (e.g., the execution cloud environment 231) with events/notifications from services in an entirely different cloud environment (e.g., the notification cloud environment 201).

According to some embodiments, an RFI service tenancy is included in each of the notification cloud environment 201 and the execution cloud environment 231. For example, as shown in FIG. 2, the notification cloud environment 201 includes an RFI service tenancy 203 that is referred to herein as a notification-side RFI service tenancy, and the execution cloud environment 231 includes an RFI service tenancy 233 that is referred to herein as an execution-side RFI service tenancy. In the notification cloud environment 201, the notification-side RFI service tenancy 203 includes a forwarder agent 205 and a metadata database 215 associated with the forwarder agent 205. The notification cloud environment 201 further includes a customer tenancy 209 and an identity management service 216. The customer tenancy 209 includes one or more cloud resources 211 that utilize one or more services provided in the notification cloud environment 201.

By some embodiments, in the execution cloud environment 231, the execution-side RFI service tenancy 233 includes a control plane 235 hosting the RFI invocation service 234, a listener agent 236 and a mapping database 237 associated with the listener agent 236. The RFI invocation service 234 is a control plane component of the service that provides users the flexibility to instantiate serverless function instances and wherein notifications received from resources in a different cloud can be used to trigger invocation of the configured functions. The execution cloud environment 231 further includes a customer tenancy 243, an identity management service 239, and a serverless function service 241. The customer tenancy 243 includes one or more functions 242 deployed therein. The serverless function service 241 comprises of a service where a server that is used to execute the function is instantiated on demand in response to a call to invoke a certain function.

The notification cloud environment 201 is communicatively coupled to the execution cloud environment 231 via a secure transport channel. Specifically, by one embodiment, the forwarder agent 205 included in the notification cloud environment 201 is communicatively coupled to the listener agent 236 included in the execution cloud environment 231 via a secure communication channel 220 (e.g., a Fastconnect communication link). With regard to the RFI service, it is noted that a customer has different set of resources defined in one cloud environment (e.g., cloud resources 211 in the notification cloud environment 201) that provide notifications on specified events. Further, the customer uses a serverless function service (e.g., serverless function service 241) that is deployed in a different cloud environment (e.g., the execution cloud environment 231) which the customer desires to use to offload their compute workloads for cost savings purposes. In other words, the customer desires to have their serverless functions in one cloud provider to be triggered based on events or notifications generated by resources in another cloud provider. According to some embodiments, in order to achieve the above stated functionalities, there is provided a set-up or registration phase, wherein the customer creates an instance of the RFI service (in the two cloud environments) and inputs necessary information about the notification source identifier and notification target identifier. Details pertaining to the registration phase are described later with reference to FIGS. 3A and 3B.

According to some embodiments, the forwarder agent 205 included in the notification-side RFI service tenancy 203 (included in the notification cloud environment 201) registers itself with cloud resources 211 (deployed in the customer tenancy 209 of the notification cloud environment 201) as being a target for receiving notifications from the cloud resources 211. Specifically, the forwarder agent 205 registers an endpoint (e.g., an HTTP endpoint) via which it expects to receive notifications from the cloud resources 211.

Upon receiving the request from the forwarder agent 205 to register as the target with respect to notifications, the cloud resources 211 (deployed in the customer tenancy 209 of the notification cloud environment 201) communicates with the identity management service 216 to validate the request from the forwarder 205. In one implementation, in validating the request, an authentication process is performed based on a subscription policy 213 defined by a user. The subscription policy 213 defines whether the forwarder agent 205 (i.e., in the RFI service account/tenancy 203) is permitted to subscribe to notifications from the cloud resources 211. It is noted that trust is established between the forwarder agent 205 and the customer tenancy 209 in the notification cloud environment based on the subscription policy 213 defined by the user.

Upon successful validation, the forwarder agent 205 is registered as a target to which the cloud resources 211 directs notifications occurring in the customer tenancy with respect to different services. It is appreciated that some services are capable of issuing/generating notifications. In this case, the forwarder agent 205 may subscribe as a target for the notifications as described above. However, in some instances, a service may be incapable of generating notifications e.g., a queuing service. In this case, the forwarder agent 205 may be configured to poll the service to obtain notifications. This is represented by the dotted line 207 in FIG. 2. Details pertaining to configuring the forwarder agent 205 to poll the services are described here with reference to FIG. 3B.

In some embodiments, the forwarder agent 205 may be configured to perform a filtering operation with respect to one or more notifications received from the cloud resource 211. Specifically, the user may define certain types of notifications that are of interest to the user. Such information may maintained in the metadata database 215 associated with the forwarder agent 205. In this manner, the forwarder agent 205, upon receiving a plurality of notifications, may communicate with the metadata database 215 to determine, for each notification, whether the type of the notification received is desired by the user. In other words, the forwarder agent performs a filtering operation in accordance with information maintained in the metadata database 215.

Upon performing the filtering operation, for each notification that is to be transmitted by the forwarder agent 205 to the listener agent 236 (in the execution cloud environment 231), the forwarder agent 205 may create a message (e.g., a notification message (i.e., referred to simply as a notification)). In one implementation, the notification message may include metadata identifying: a type of notification (i.e., the metadata includes a notification identifier) and the cloud resource that generated the notification (i.e., the metadata includes a cloud resource identifier). The forwarder agent 205 further forwards the notification message to the listener agent 236 (over the secure transport channel 220) for further processing (e.g., to invoke a function (associated with the notification) to be executed in the execution cloud environment that hosts the listener agent 236).

The notification transmitted by the forwarder agent 205 is received by the listener agent 236. It is noted that the listener agent 236 is disposed in a data plane of the RFI service in the execution-side RFI service tenancy 233. According to one embodiment, the listener agent 236 upon receiving the notification, performs a lookup operation to identify a function (and a corresponding customer tenancy that hosts the function) that is to be invoked based on the received notification. In one implementation, the listener agent 236 communicates with the mapping database 237 to identify the function that is to be invoked. It is appreciated that the mapping database 237 stores information pertaining to a mapping of a notification and a corresponding function that is to be invoked. Contextual information related to a customer tenancy which hosts the function may also be stored in the mapping database 237.

Upon identifying the function (and the corresponding customer tenancy in the execution cloud environment hosting the function), the listener agent 236 obtains a credential e.g., a token, from the identity management service 239 of the execution cloud environment 231. Further, the listener agent 236 forwards the token to the serverless function service 241 in order to use the serverless function service 241 to invoke the function 242 in the customer tenancy 243. The serverless function service 241 in response to obtaining the credential from the listener agent 236, communicates with the identity management service 239 to determine a privilege associated with the credential i.e., determine whether the credential has sufficient privileges to trigger the serverless function service 241. In other words, a check is performed to determine whether the listener agent (i.e., the entity from which the token was obtained) is permitted to issue a query targeted to the customer tenancy hosting the function. Such a check can be performed based on information maintained in an execution policy 245 that is defined by the user. The execution policy 245 defines whether a service e.g., the listener agent 236 deployed in the execution side service tenancy is permitted to access the function(s) deployed in the customer tenancy 243 of the execution cloud environment 231. Upon a successful check being performed, the serverless function service 241 launches the function 242 in the customer tenancy 243 i.e., the serverless function service 241 invokes the function 242 to be executed in the customer tenancy 243.

In this manner, as described in the above embodiment, the RFI service enables notification received in a source cloud environment (i.e., notification cloud environment 201) to invoke a function for execution in a target cloud environment (i.e., execution cloud environment 231) that is different than the source cloud environment. Furthermore, it is appreciated that the above-described embodiment of FIG. 2 is in no way limiting the scope of the present disclosure. Rather, modifications to the architecture of the RFI service are well within the scope of the present disclosure. For example, FIG. 2 depicts a single listener agent 236 deployed in a data plane of the execution-side RFI service tenancy and a single forwarder agent 205 deployed in a data plane of the notification-side RFI service tenancy. According to some embodiments, an alternate architecture of the RFI service may include a pool of listener agents in the execution-side RFI service tenancy, and a pool of forwarder agents deployed in the notification-side RFI service tenancy. In such a setting, a pair of agents (i.e., a forwarder agent and a listener agent) may be selected dynamically based on certain conditions (e.g., a current traffic load in the system) to transmit the notification from the notification cloud environment 201 to the execution cloud environment 231.

Figure 3A:
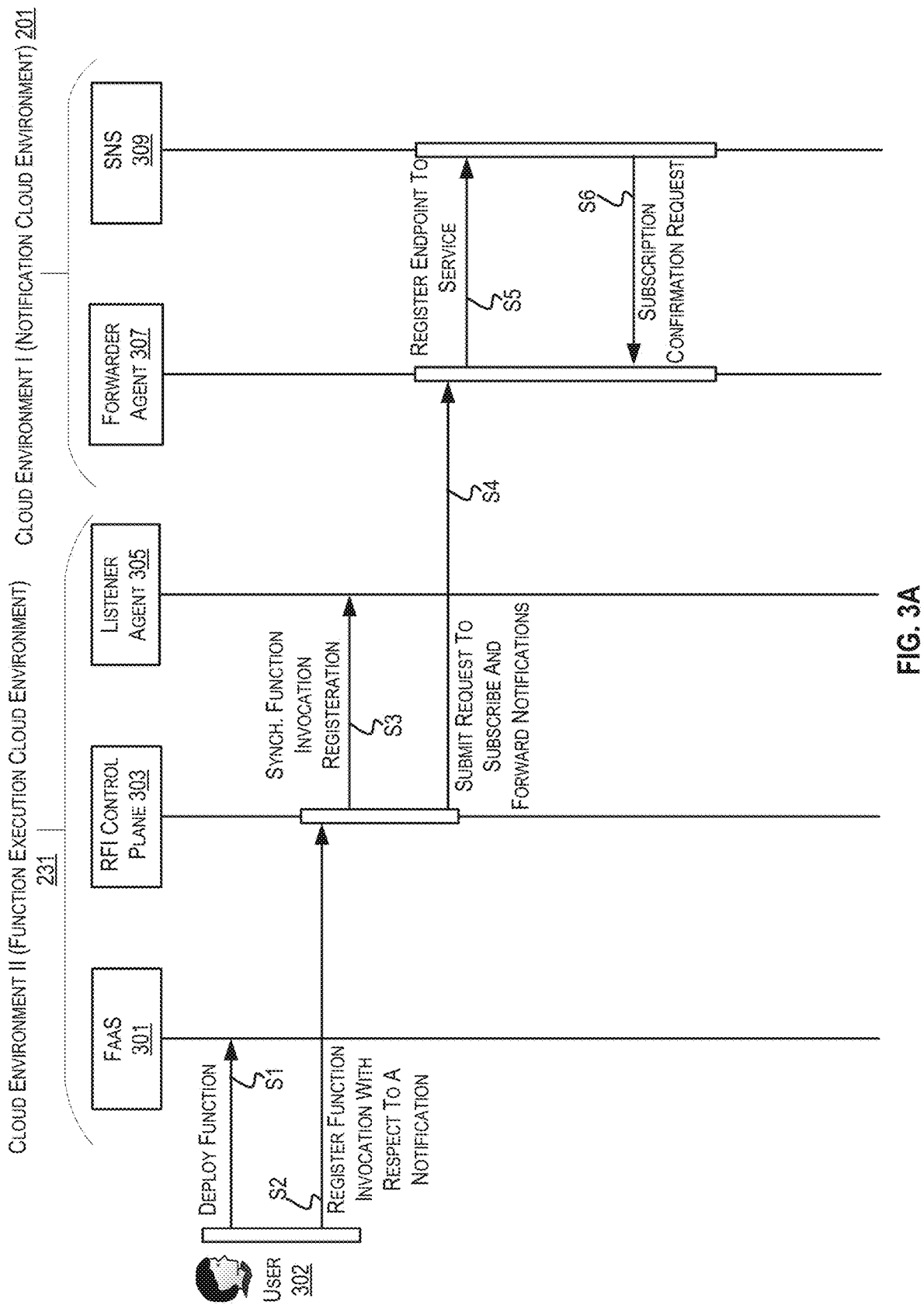
FIG. 3A depicts a swim diagram illustrating a process of registering invocation of a function with respect to a notification, according to certain embodiments.

FIG. 3A depicts a swim diagram illustrating a process of registering an invocation of a function with respect to a notification received from a service, according to certain embodiments. As shown in FIG. 3A, the components of the swim diagram include a Function-as-a-Service (FaaS) module 301, an RFI control plane module 303, a listener agent 305, a forwarder agent 307, and an SNS (simple notification service) service module 309. It is appreciated that the FaaS module 301, the RFI control plane module 303, and the listener agent 305 are deployed in the execution cloud environment 231, whereas the forwarder agent 307 and the SNS module are deployed in the notification cloud environment 201.

As shown in FIG. 3A, in step S1, a user 302 deploys a function with the FaaS module 301 in the execution cloud environment 231. In step S2, the user 302 registers a function invocation with respect to a notification in the RFI control plane 303. In the example depicted in FIG. 3A, the service under consideration in the notification cloud environment 201 is considered to be a simple notification service (i.e., SNS). It is appreciated that the notification may correspond to a SNS-topic. Further, the registration of the function invocation may include an identifier (e.g., a resource identifier) of a resource that is deployed in the notification cloud environment 201 and utilizes the service (i.e., SNS).

Once the function invocation request is registered with the RFI control plane 303, the RFI control plane 303 synchronizes the request with the listener agent 305 and the forwarder agent 307. Specifically, in step S3, the RFI control plane 303 registers the function invocation request with the notification (e.g., SNS topic) in the listener agent 305. In other words, the listener agent 305 stores a mapping of a notification and a corresponding function that is to be invoked (on receiving the notification) in a local database associated with the listener agent 305 (e.g., mapping database 237 of FIG. 2).

In step S4, the RFI control plane 303 submits a request to the forwarder agent 307 included in the notification cloud environment 201. According to some embodiments, the request notifies the forwarder agent 307 to register (i.e., subscribe) itself with the service 309 in order to receive notifications from the service 309. In step S5, the forwarder agent 307 registers with the service to receive notifications from the service. For instance, in one implementation, the forwarder agent 307 may register an endpoint (e.g., an HTTP endpoint) with the service 309 in order to receive notifications from the service via the endpoint. In step S6, the service 309 transmits an acknowledgement back to the forwarder agent 307 (i.e., the service 309 confirms subscription of the forwarder agent 307 with respect to receiving notifications (e.g., a notification with respect to an SNS topic)). Upon confirming the subscription, the forwarder agent 307 is configured to receive notifications on the registered endpoint (e.g., HTTP endpoint from the service 309).

Figure 3B:
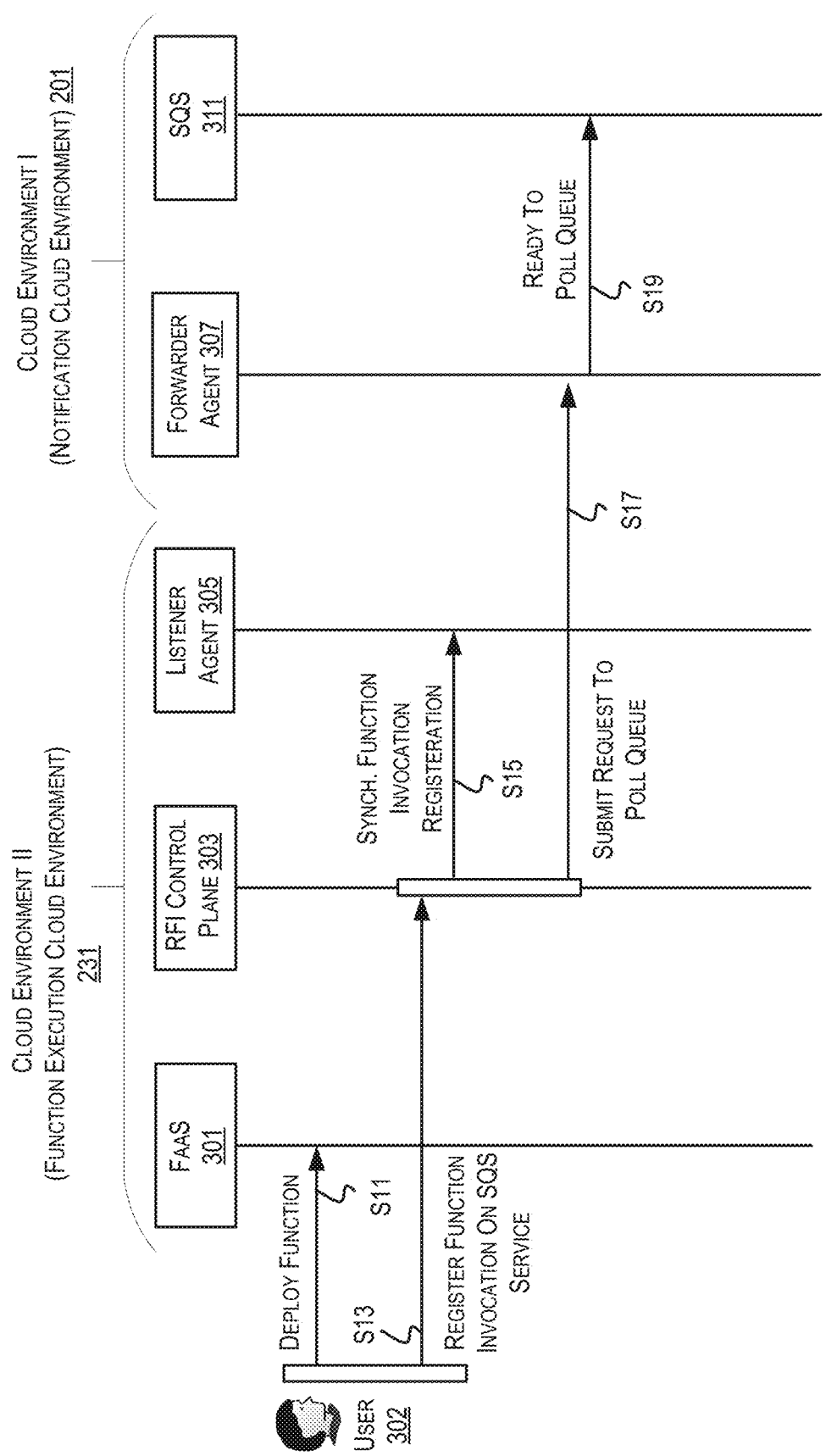
FIG. 3B depicts another swim diagram illustrating a process of registering invocation of a function with respect to a notification, according to certain embodiments.

It is appreciated that in some cases, the service executed in the notification cloud environment 201 may be incapable of issuing notifications. In this case, the forwarder agent is configured to poll the service to obtain the notifications. The service in this instance may correspond to a simple queue service (SQS) 311 as shown in FIG. 3B. FIG. 3B depicts another swim diagram illustrating a process of registering invocation of a function with respect to a notification (by polling) according to certain embodiments. In FIG. 3B, the steps S11, S13, and S15 are similar to the steps S1, S2, and S3 respectively, of FIG. 3A. Accordingly, for the sake of avoiding repetition, a description of these steps is not repeated here again.

In step S17, the RFI control plane 303 submits a request to the forwarder agent 307. The request indicates to the forwarder agent that the forwarder agent can poll the service (SQS) (e.g., poll a queue associated with the service 311 in order to obtain new messages (i.e., notifications)). In step S19, the forwarder agent 307 upon receiving the request from the RFI control plane 303 is ready to poll the queue associated with the service 311.

Figure 4A:
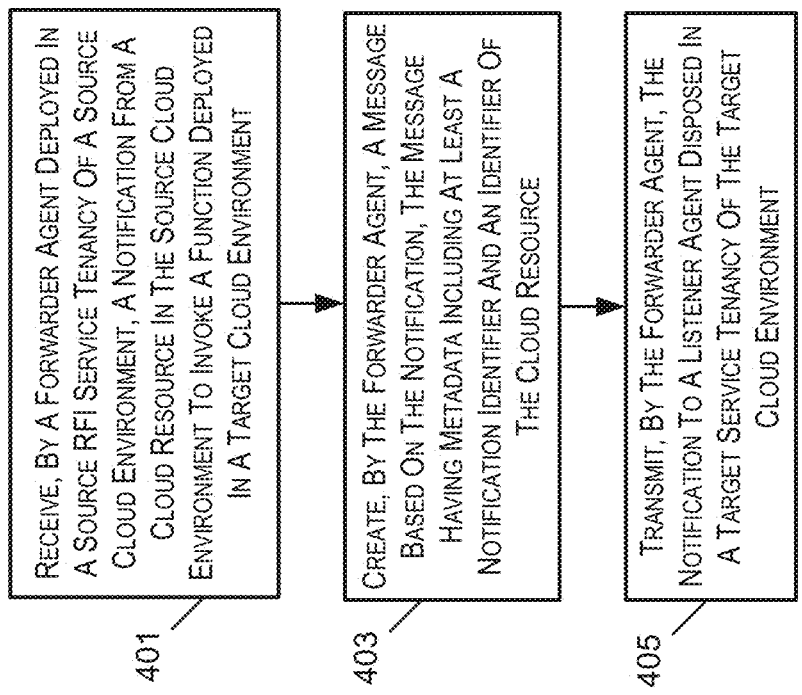
FIG. 4A illustrates a simplified flowchart depicting steps performed by a forwarder agent, according to certain embodiments.

Turning to FIG. 4A, there is illustrated a simplified flowchart depicting steps performed by a forwarder agent, according to certain embodiments. The processing depicted in FIG. 4A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4A and described below is intended to be illustrative and non-limiting. Although FIG. 4A depicts the various processing steps occurring in a particular sequence or order, this is not intended to be limiting. In certain alternative embodiments, the steps may be performed in some different order or some steps may also be performed in parallel.

The process commences in step 401, where a forwarder agent deployed in a source RFI service tenancy in a source cloud environment receives a notification from a cloud resource (utilizing some service) to invoke a function that is deployed in a target cloud environment (i.e., different than the source cloud environment). For instance, referring to FIG. 2, the forwarder agent 205, that is deployed in the notification-side RFI service tenancy 203, receives a notification to invoke a function from cloud resource 211.

In step 403, according to some embodiments, the forwarder agent creates a message based on the received notification. In one implementation, the created message may include metadata identifying a type of notification (i.e., the metadata may include a notification identifier) as well as an ID of the cloud resource that issued the notification. The message created in step 403 is transmitted by the forwarder agent (e.g., as a notification message) to a listener agent that is disposed in a target RFI service tenancy of a target cloud environment. For instance, referring to FIG. 2, the forwarder agent transmits the notification to the listener agent 236 that is disposed in the execution-side RFI service tenancy 233.

Figure 4B:
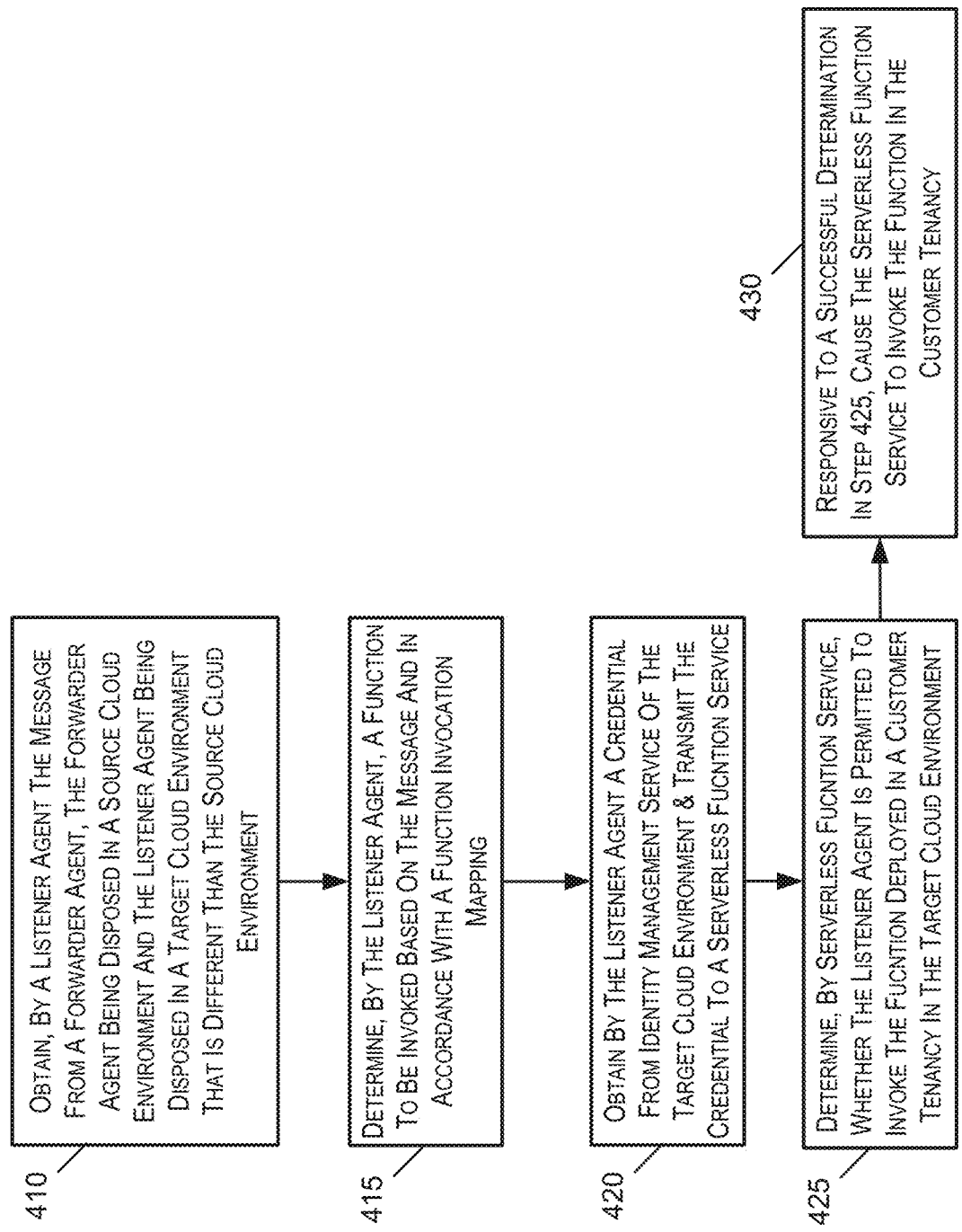
FIG. 4B illustrates a simplified flowchart depicting steps performed by a listener agent, according to certain embodiments.

Turning now to FIG. 4B, there is illustrated a simplified flowchart depicting steps performed by a listener agent, according to certain embodiments. The processing depicted in FIG. 4B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4B and described below is intended to be illustrative and non-limiting. Although FIG. 4B depicts the various processing steps occurring in a particular sequence or order, this is not intended to be limiting. In certain alternative embodiments, the steps may be performed in some different order or some steps may also be performed in parallel.

The process commences in step 410, where a listener agent receives a message (e.g., a notification) from the forwarder agent. For instance, referring to FIG. 2, the listener agent 236 deployed in an execution-side RFI tenancy 233 included in the execution cloud environment receives the notification from the forwarder agent 205 that is deployed in a notification-side RFI tenancy included in the notification cloud environment. In step 415, the listener agent determines a function that is to be invoked based on the received message and in accordance with a function invocation mapping. For instance, the listener agent 236 performs a lookup operation in a mapping database 237 that is associated with the listener agent 236. The mapping database maintains a plurality of mappings, where each mapping corresponds to a notification and an associated function (including contextual information) that is to be invoked. It is appreciated that the contextual information may include information identifying a customer tenancy (e.g. customer tenancy 243 in FIG. 2) in the execution cloud environment that hosts the function.

The process then moves to step 420, where the listener agent 236 obtains a credential e.g., a token from the identity management service included in the target cloud environment i.e., the execution cloud environment. Upon obtaining the credential, the listener agent 236 transmits the credential to a serverless function service. The process then moves to step 425, wherein the serverless function service communicates with the identity management service of the target cloud environment to verify privileges associated with the credential received from the listener agent. Specifically, by one implementation, a check is performed to determine whether the listener agent (i.e., the entity from which the token was obtained) is permitted to issue a query targeted to the customer tenancy hosting the function. Such a check can be performed based on information maintained in an execution policy (e.g., execution policy 245 of FIG. 2) that is defined by the user. The execution policy defines whether a service e.g., the listener agent 236 deployed in the execution side service tenancy is permitted to access the function(s) deployed in the customer tenancy 243 of the execution cloud environment 231.

Responsive to a successful determination made in step 425, the process moves to step 430 where the serverless function service invokes the function in the customer tenancy to be executed. Accordingly, as described in the flowcharts of FIGS. 4A and 4B, the RFI service of the present disclosure provides integration between serverless functions executed in one cloud environment based on events/notifications from services in an entirely different cloud environment.

Figure 5A:
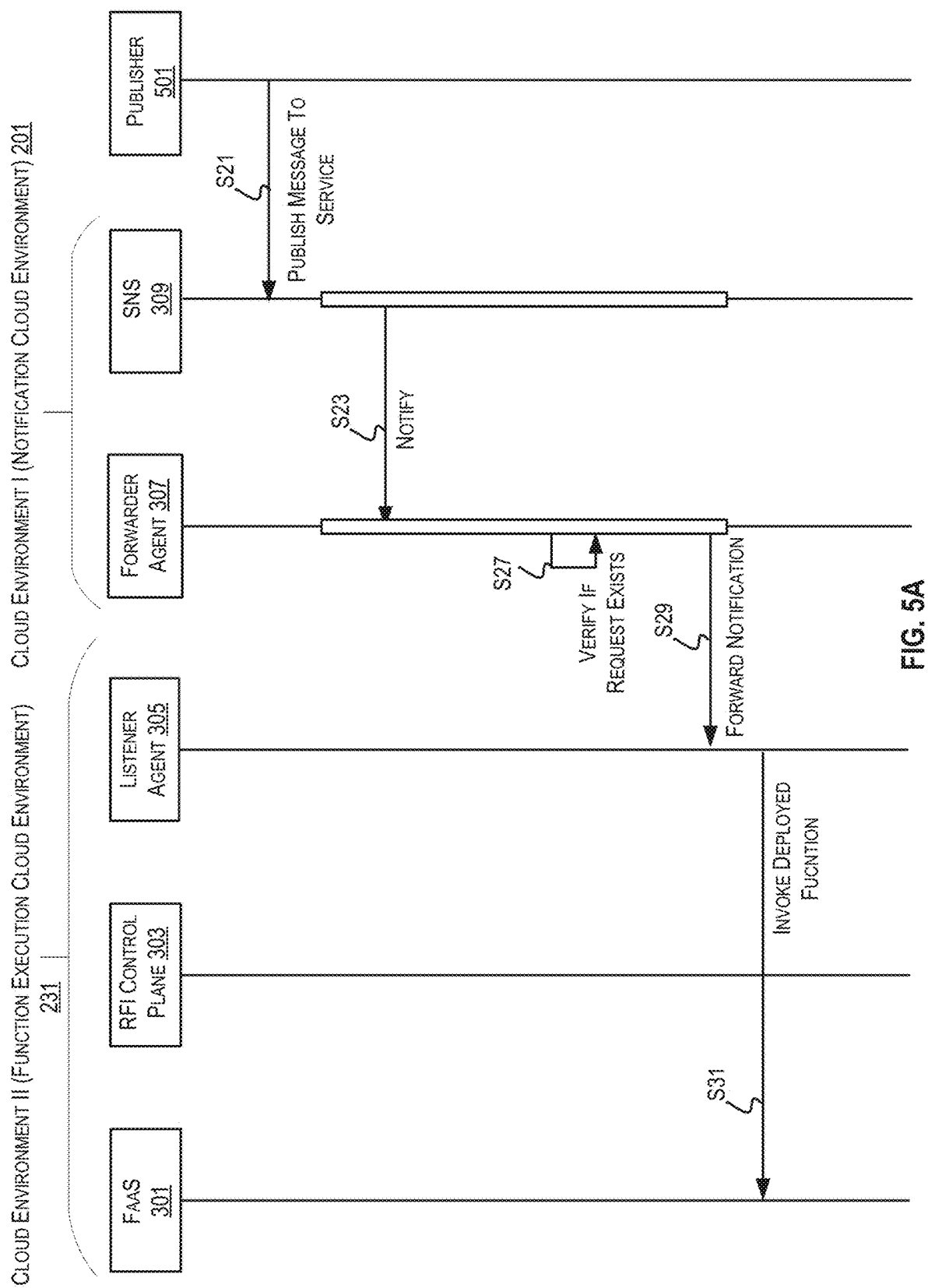
FIG. 5A illustrates a swim diagram illustrating the invocation of a function upon completing the registration process of FIG. 4A, according to certain embodiments.

FIG. 5A illustrates a swim diagram illustrating the invocation of a function upon completing the registration process of FIG. 4A, according to certain embodiments. As shown in FIG. 5A, the components of the swim diagram include a Function-as-a-Service (FaaS) module 301, an RFI control plane module 303, a listener agent 305, a forwarder agent 307, an SNS (simple notification service) service module 309, and a publisher 501. It is appreciated that the FaaS module 301, the RFI control plane module 303, and the listener agent 305 are deployed in the execution cloud environment 231, whereas the forwarder agent 307 and the SNS module are deployed in the notification cloud environment 201.

In step S21, the publisher 501 publishes a message to the SNS service 309. The publishing of the message on the SNS service 309 causes the SNS service to issue a notification that is transmitted to the forwarder agent 307. It is noted that this occurs as the forwarder has registered itself with the service 309 to receive notifications (step S5 of FIG. 3A). In step S27, the forwarder 307 verifies if a request for such a notification exists and is valid. Specifically, the forwarder 307 may access the metadata database 215 in FIG. 2, to determine whether a user has not filtered the notification. Upon successful determination, the forwarder 307 forwards the notification to the listener agent 305.

By some embodiments, the listener agent 305 accesses its local database (e.g., mapping database 237 in FIG. 2) to determine a function that is to be invoked based on the received notification. According to some embodiments, note that the listener agent 305 maintains a plurality of mappings in the mapping database, where each mapping corresponds to a notification and an associated function (including contextual information) that is to be invoked. It is noted that the contextual information may include information identifying a customer tenancy in the execution cloud environment that hosts the function. Upon determining the function (and the customer tenancy hosting the function) that is to be invoked, the listener agent 305 obtains from an identity management service of the execution cloud environment 231, a token that is to be used to invoke the function in the customer tenancy. Further, the listener agent 305 uses a serverless function service to invoke the particular function deployed in the customer tenancy (step S31). As stated previously, it is appreciated that the serverless function service in the execution cloud environment 231 may validate the token received from the listener agent 305 by communicating with the identity management service of the execution cloud environment 231.

Figure 5B:
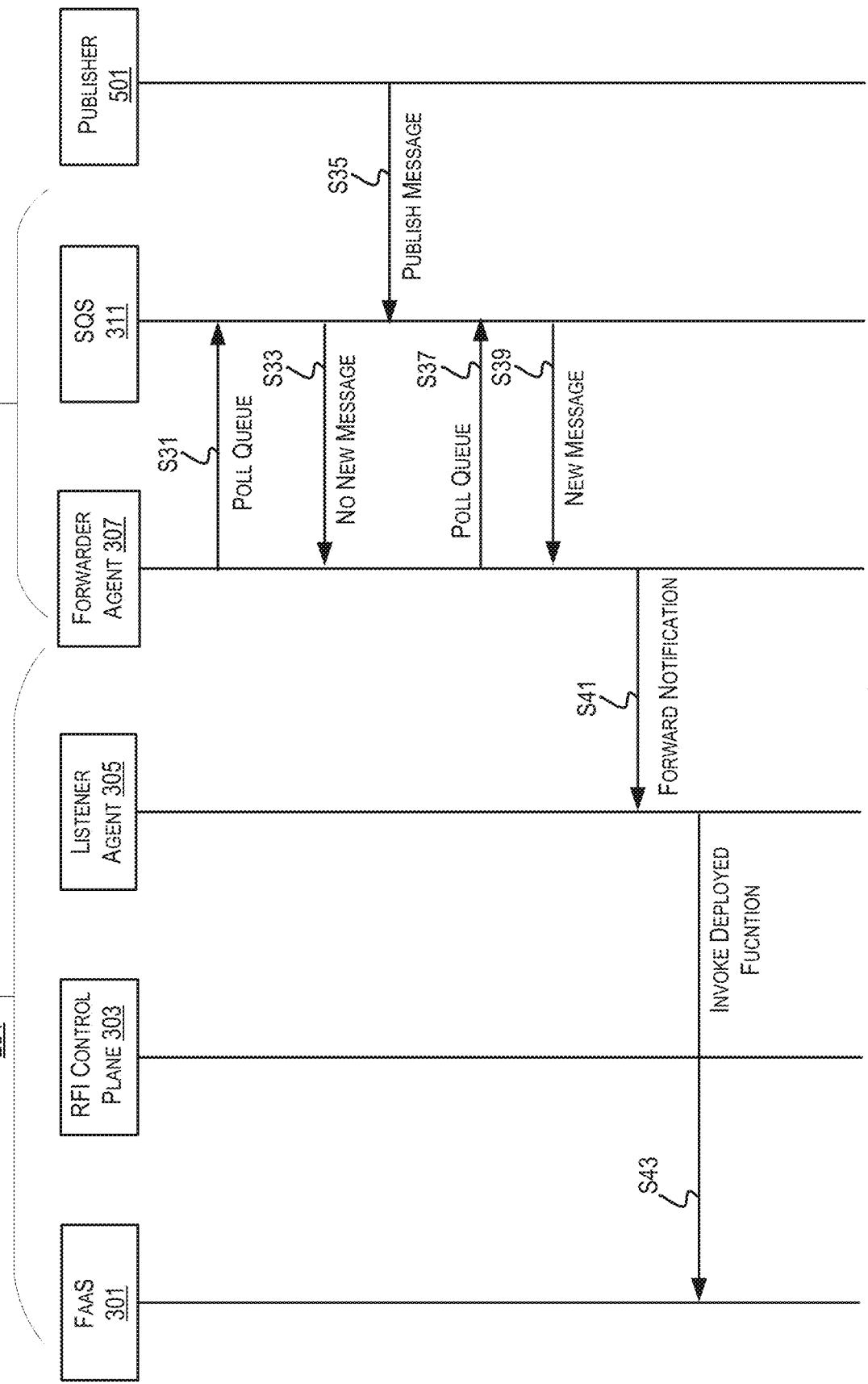
FIG. 5B illustrates a swim diagram illustrating the invocation of a function upon completing the registration process of FIG. 4B, according to certain embodiments.

FIG. 5B illustrates a swim diagram illustrating the invocation of a function upon completing the registration process of FIG. 4B, according to certain embodiments. Specifically, the swim diagram of FIG. 5B corresponds to the case where a service is not configured to send a notification to the forwarder agent 307, and where the forwarder agent 307 polls the service (e.g., SQS service) to obtain a notification.

In step S31, the forwarder agent 307 pools a queue (e.g., a queue associated with the SQS service 311) to check for presence of a new message in the queue. In step S33, as no new messages have been posted on the queue, the forwarder agent 307 receives an indication notifying it that there is no new message on the queue. In step S35, a publisher 501 publishes a new message on the queue. In step S37, the forwarder agent 307 polls the queue to determine presence of a new message in the queue. In step S39, the forwarder agent 307 obtains the new message from the queue. In step S41, the forwarder agent proceeds to forward a notification to the listener agent 305. As stated previously with reference to FIG. 5A, the listener agent 305 may perform processing with respect to determining a function that is to be invoked based on the notification, as well as obtaining (from an identity management service of the execution cloud environment 231), a token that is to be used to invoke the function in the customer tenancy of the execution cloud environment. Further, by some embodiments, the listener agent 305 uses a serverless function service to invoke the particular function deployed in the customer tenancy of the execution cloud environment in step S43.

Example Infrastructure as Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
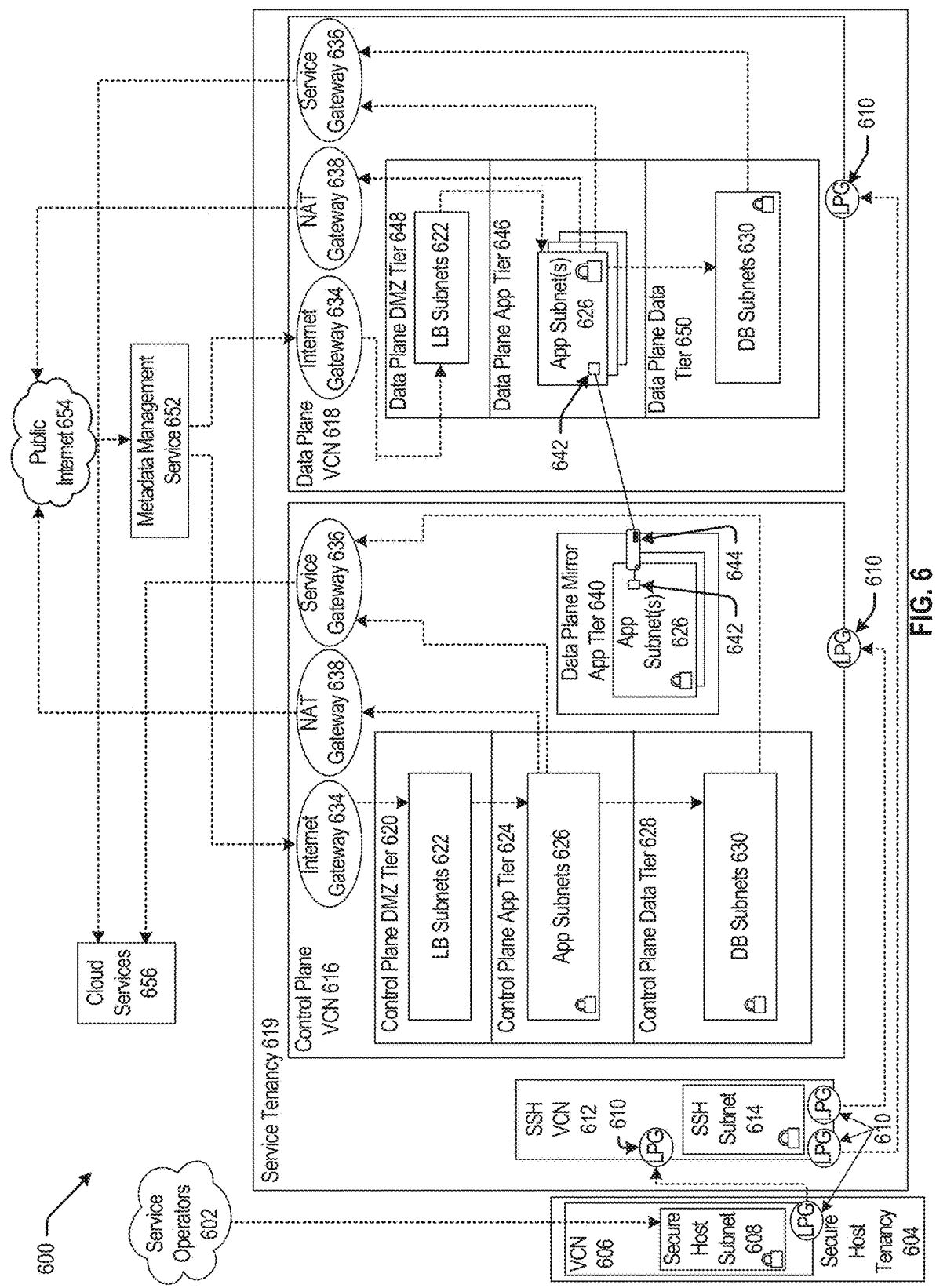
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
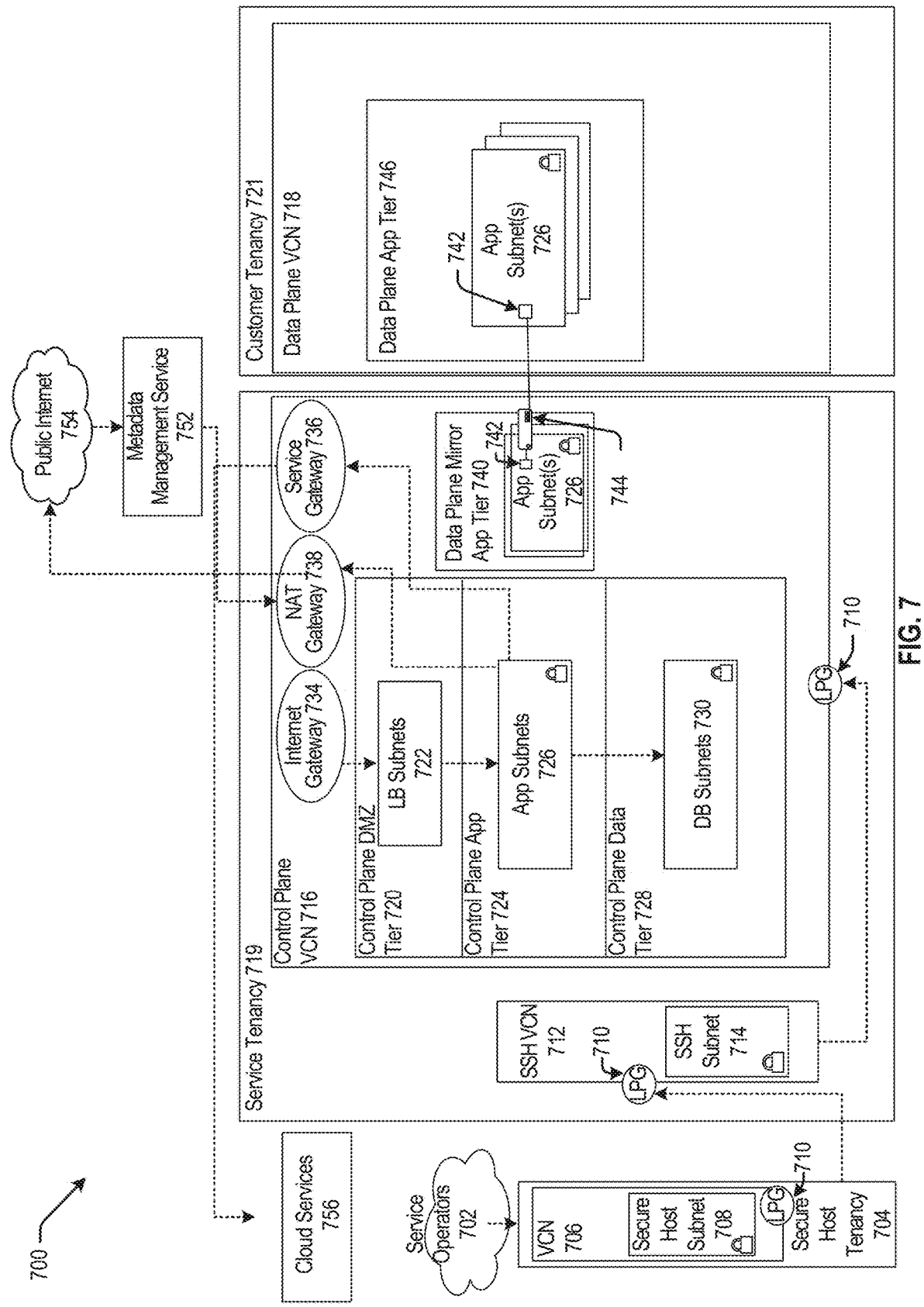
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
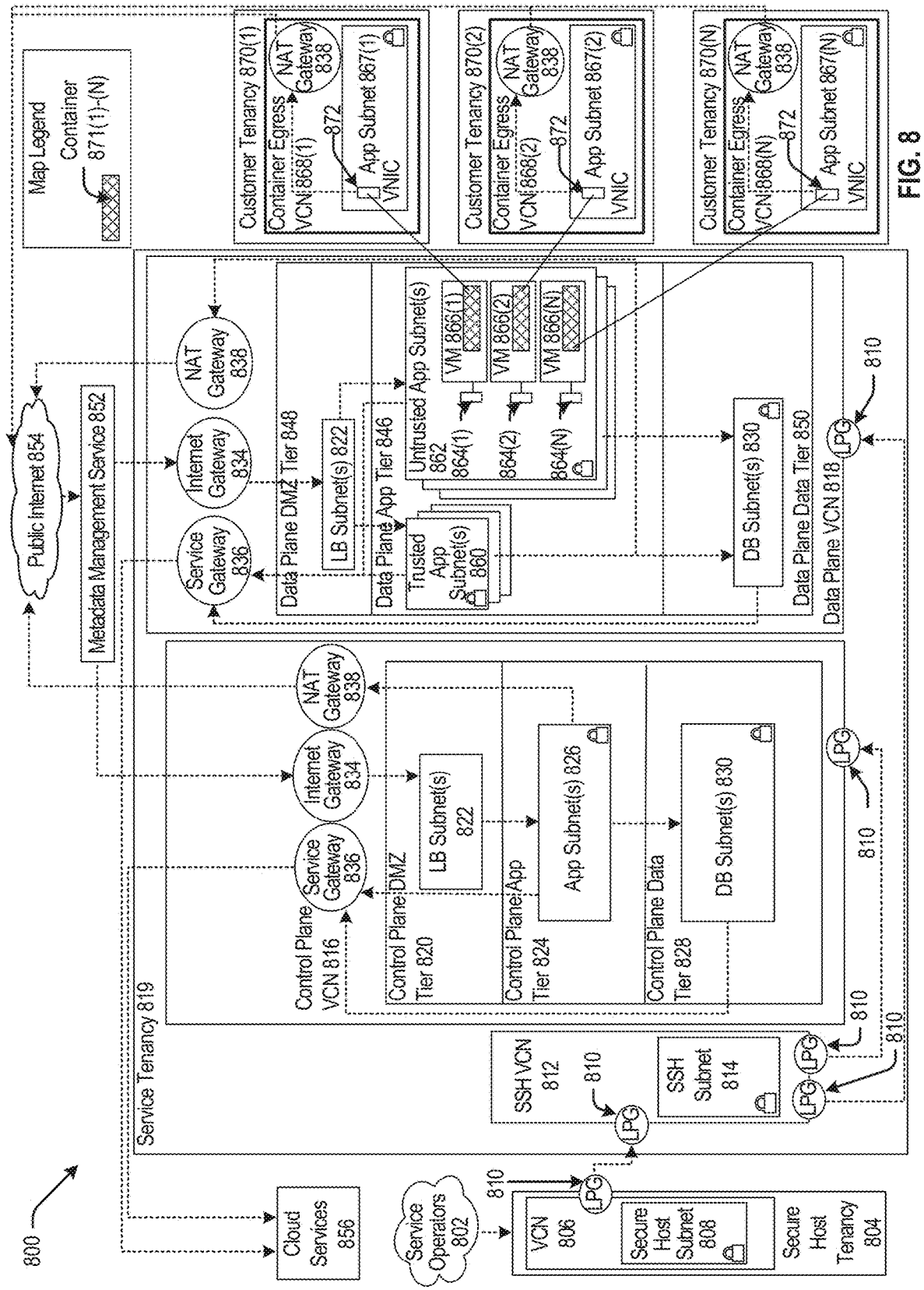
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
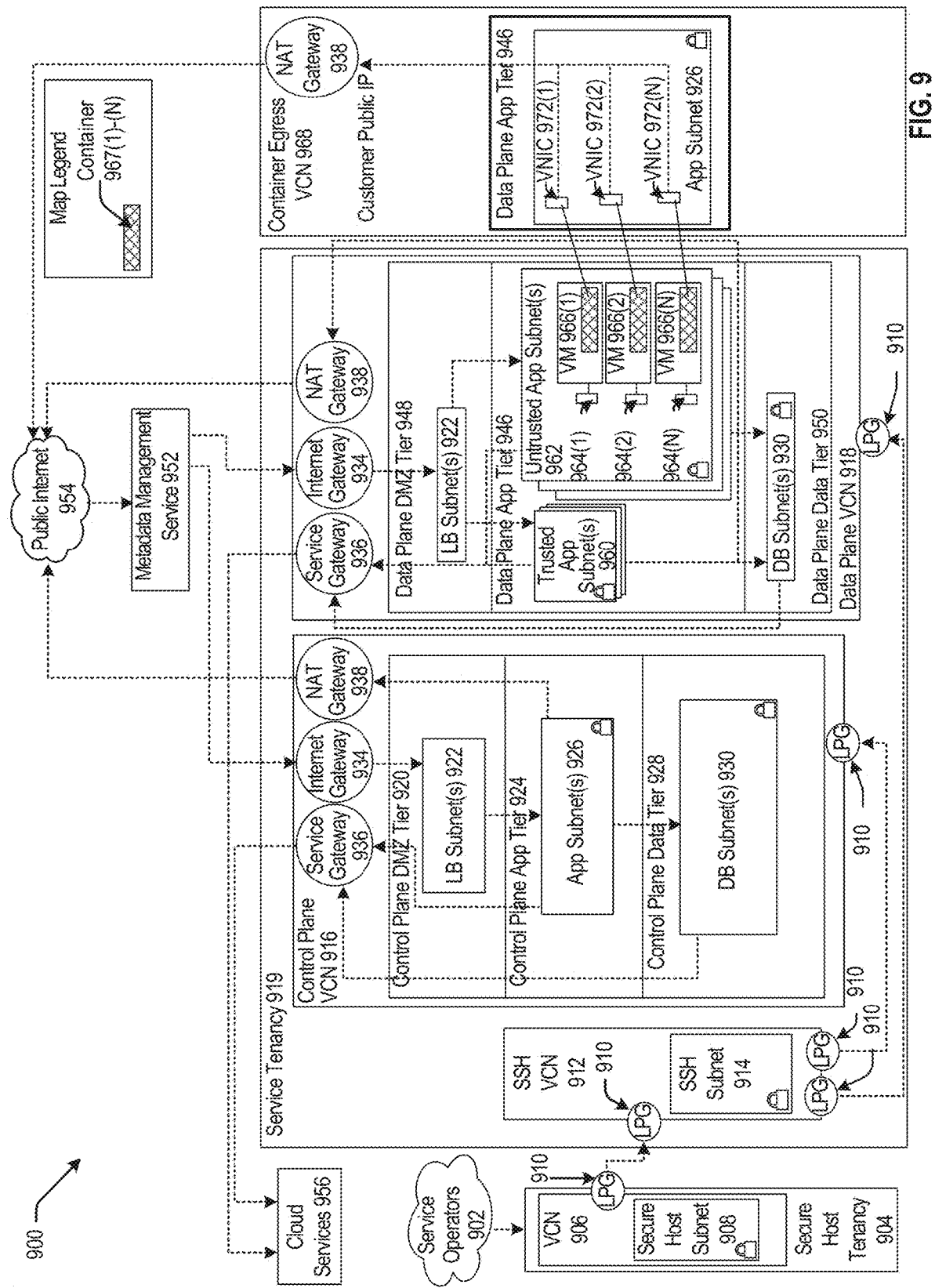
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
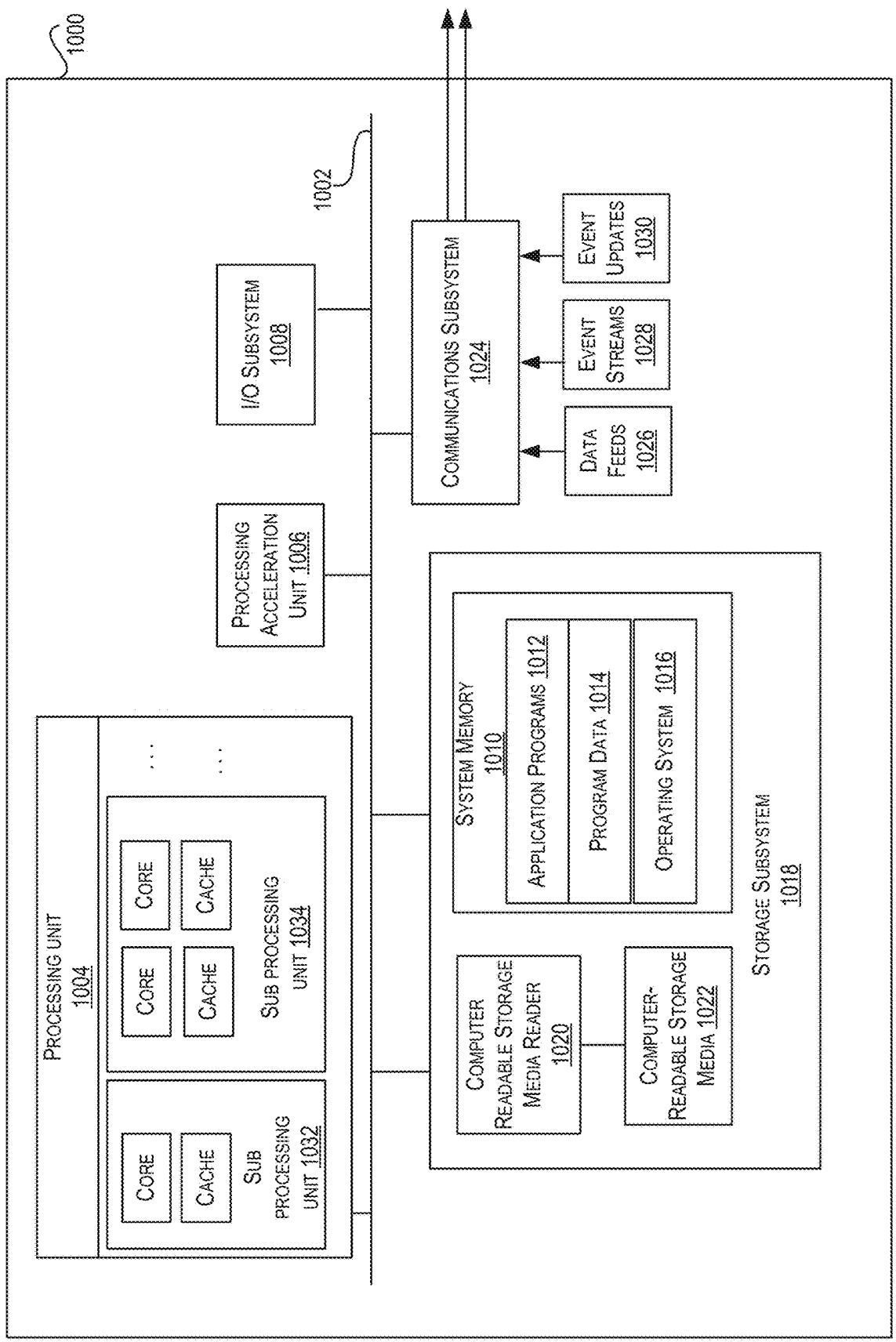
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
deploying, by a remote function invocation service provided by a target cloud environment, a target agent in a dataplane of a target service tenancy instantiated in the target cloud environment;

deploying, by the remote function invocation service provided by the target cloud environment, a source agent in a corresponding dataplane of a source service tenancy instantiated in a source cloud environment, wherein the target cloud environment is provided by a first cloud service provider and the source cloud environment is provided by a second cloud service provider that is different than the first cloud service provider;

obtaining, by the target agent, a notification from the source agent, wherein the source agent receives the notification from a cloud resource that is deployed in a source customer tenancy of the source cloud environment and requests to utilize a function deployed in a target customer tenancy of the target cloud environment, wherein the target agent is configured to: (i) obtain an identifier associated with the notification, and (ii) query a mapping database to obtain the function associated with the identifier, wherein the mapping database is preconfigured with a plurality of mappings, each mapping identifying a particular function that is to be invoked with respect to a particular identifier;

determining, by the target agent, the function that is to be invoked based on the notification;

verifying whether the target agent that is deployed in the target service tenancy of the target cloud environment is permitted to invoke the function that is deployed in the target customer tenancy of the target cloud environment; and responsive to a successful verification, invoking by the target agent the function in the target customer tenancy of the target cloud environment.

2. The method of claim 1, wherein the target agent is communicatively coupled with the source agent by a secure communication channel.

3. The method of claim 1, wherein the source agent: (i) registers with the cloud resource deployed in the source customer tenancy of the source cloud environment or polls a queue associated with the cloud resource so as to receive the notification, and (ii) forwards the notification to the target agent upon receiving the notification from the cloud resource.

4. The method of claim 1, wherein the step of verifying further comprising:

determining whether the target agent is permitted to access the target customer tenancy in the target cloud environment in accordance with a policy associated with the target cloud environment.

5. The method of claim 4, further comprising:

responsive to a successful determination, obtaining by the target agent a token from an identity management service of the target cloud environment; and forwarding the token to a serverless functions service deployed in the target cloud environment.

6. The method of claim 5, further comprising:

causing by the serverless functions service, the function deployed in the target customer tenancy of the target cloud environment to be executed.

7. The method of claim 5, wherein the serverless functions service communicates with the identity management service of the target cloud environment to determine a set of privileges associated with the token.

8. A non-transitory computer readable medium storing specific computer-executable instructions that, when executed by a processor, cause a computer system to perform operations comprising:

deploying, by a remote function invocation service provided by a target cloud environment, a target agent in a dataplane of a target service tenancy instantiated in the target cloud environment;

deploying, by the remote function invocation service provided by the target cloud environment, a source agent in a corresponding dataplane of a source service tenancy instantiated in a source cloud environment, wherein the target cloud environment is provided by a first cloud service provider and the source cloud environment is provided by a second cloud service provider that is different than the first cloud service provider;

obtaining, by the target agent, a notification from the source agent, wherein the source agent receives the notification from a cloud resource that is deployed in a source customer tenancy of the source cloud environment and desires to utilize a function deployed in a target customer tenancy of the target cloud environment, wherein the target agent is configured to: (i) obtain an identifier associated with the notification, and (ii) query a mapping database to obtain the function associated with the identifier, wherein the mapping database is preconfigured with a plurality of mappings, each mapping identifying a particular function that is to be invoked with respect to a particular identifier;

determining, by the target agent, the function that is to be invoked based on the notification;

verifying whether the target agent that is deployed in the target service tenancy of the target cloud environment is permitted to invoke the function that is deployed in the target customer tenancy of the target cloud environment; and responsive to a successful verification, invoking by the target agent the function in the target customer tenancy of the target cloud environment.

9. The non-transitory computer readable medium storing specific computer-executable instructions of claim 8, wherein the target agent being communicatively coupled with the source agent by a secure communication channel.

10. The non-transitory computer readable medium storing specific computer-executable instructions of claim 8, wherein the source agent: (i) registers with the cloud resource deployed in the source customer tenancy of the source cloud environment or polls a queue associated with the cloud resource so as to receive the notification, and (ii) forwards the notification to the target agent upon receiving the notification from the cloud resource.

11. The non-transitory computer readable medium storing specific computer-executable instructions of claim 8, wherein the step of verifying further comprising:

determining whether the target agent is permitted to access the target customer tenancy in the target cloud environment in accordance with a policy associated with the target cloud environment.

12. The non-transitory computer readable medium storing specific computer-executable instructions of claim 11, further comprising:

responsive to a successful determination, obtaining by the target agent a token from an identity management service of the target cloud environment; and forwarding the token to a serverless functions service deployed in the target cloud environment.

13. The non-transitory computer readable medium storing specific computer-executable instructions of claim 12, further comprising:

causing by the serverless functions service, the function deployed in the target customer tenancy of the target cloud environment to be executed.

14. The non-transitory computer readable medium storing specific computer-executable instructions of claim 13, wherein the serverless functions service communicates with the identity management service of the target cloud environment to determine a set of privileges associated with the token.

15. A system comprising:
a processor; and
a memory including instructions that, when executed with the processor, cause the system to, at least:
  deploy, by a remote function invocation service provided by a target cloud environment, a target agent in a dataplane of a target service tenancy instantiated in the target cloud environment;
  deploy, by the remote function invocation service provided by the target cloud environment, a source agent in a corresponding dataplane of a source service tenancy instantiated in a source cloud environment, wherein the target cloud environment is provided by a first cloud service provider and the source cloud environment is provided by a second cloud service provider that is different than the first cloud service provider;
  obtain, by the target agent, a notification from the source agent, wherein the source agent receives the notification from a resource that is deployed in a source customer tenancy of the source cloud environment and requests to utilize a function deployed in a target customer tenancy of the target cloud environment, wherein the target agent is configured to: (i) obtain an identifier associated with the notification, and (ii) query a mapping database to obtain the function associated with the identifier, wherein the mapping database is preconfigured with a plurality of mappings, each mapping identifying a particular function that is to be invoked with respect to a particular identifier;
  determine, by the target agent, the function that is to be invoked based on the notification;
  verify whether the target agent that is deployed in the target service tenancy of the target cloud environment is permitted to invoke the function that is deployed in the target customer tenancy of the target cloud environment; and
  responsive to a successful verification, invoke by the target agent the function in the target customer tenancy of the target cloud environment.

* * * * *

UNITED STATES PATENT AND TRADEMARK OFFICE
CERTIFICATE OF CORRECTION

PATENT NO. : 12,260,261 B2
APPLICATION NO. : 17/850693
DATED : March 25, 2025
INVENTOR(S) : Kalley et al.

Page 1 of 1

It is certified that error appears in the above-identified patent and that said Letters Patent is hereby corrected as shown below:

In the Drawings

On sheet 4 of 14, in FIG. 3A, under reference numeral S3, Line 3, delete "REGISTERATION" and insert -- REGISTRATION --, therefor.

On sheet 5 of 14, in FIG. 3B, under reference numeral S15, Line 3, delete "REGISTERATION" and insert -- REGISTRATION --, therefor.

On sheet 7 of 14, in FIG. 4B, under reference numeral 420, Line 4, delete "FUCNTION" and insert -- FUNCTION --, therefor.

On sheet 7 of 14, in FIG. 4B, under reference numeral 425, Line 1, delete "FUCNTION" and insert -- FUNCTION --, therefor.

On sheet 7 of 14, in FIG. 4B, under reference numeral 425, Line 3, delete "FUCNTION" and insert -- FUNCTION --, therefor.

On sheet 8 of 14, in FIG. 5A, under reference numeral S31, Line 2, delete "FUCNTION" and insert -- FUNCTION --, therefor.

On sheet 9 of 14, in FIG. 5B, under reference numeral S43, Line 2, delete "FUCNTION" and insert -- FUNCTION --, therefor.

Signed and Sealed this
Seventeenth Day of June, 2025

Coke Morgan Stewart
*Acting Director of the United States Patent and Trademark Office*